United States Patent
Rocquelay et al.

(10) Patent No.: US 11,153,877 B2
(45) Date of Patent: Oct. 19, 2021

(54) METHOD FOR BONDING A PLURALITY OF RADIO CONNECTIONS IN A WIRELESS NETWORK

(71) Applicant: SAGEMCOM BROADBAND SAS, Rueil Malmaison (FR)

(72) Inventors: Antonie Rocquelay, Rueil Malmaison (FR); Clément Parisot, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/960,247

(22) PCT Filed: Jan. 29, 2019

(86) PCT No.: PCT/EP2019/052068
§ 371 (c)(1),
(2) Date: Jul. 6, 2020

(87) PCT Pub. No.: WO2019/149679
PCT Pub. Date: Aug. 8, 2019

(65) Prior Publication Data
US 2021/0068109 A1    Mar. 4, 2021

(30) Foreign Application Priority Data

Jan. 31, 2018 (FR) .................................. 1850798

(51) Int. Cl.
*H04W 72/04*    (2009.01)
*H04W 12/06*    (2021.01)

(52) U.S. Cl.
CPC ....... *H04W 72/0453* (2013.01); *H04W 12/06* (2013.01)

(58) Field of Classification Search
None
See application file for complete search history.

(56) References Cited

FOREIGN PATENT DOCUMENTS

| EP | 3174325 A1 | 5/2017 |
|----|-----------|--------|
| EP | 3217758 A1 | 9/2017 |

OTHER PUBLICATIONS

May 7, 2019 International Search Report issued in International Patent Application No. PCT/EP2019/052068.

*Primary Examiner* — Adolf Dsouza
(74) *Attorney, Agent, or Firm* — Oliff PLC; R. Brian Drozd

(57) ABSTRACT

The invention relates particularly to a method for a wireless communication network, the method allowing the bonding of a plurality of radio connections between a client electronic device and a master electronic device, the method having the steps of receiving, coming from a client electronic device, a message having a request to establish a new connection, the message having an identifier of the client electronic device and authentication information, determining whether a second connection is already established between the master electronic device and the client electronic device, and, if such is the case, then sending, via the connection already established, a message having a request to verify the establishment request received, the message having the authentication information received, receiving a message having information validating the request to establish the new connection, and establishing the new connection between the client electronic device and the master electronic device.

12 Claims, 4 Drawing Sheets

METHOD FOR BONDING A PLURALITY OF RADIO CONNECTIONS IN A WIRELESS NETWORK

The present invention relates to the field of wireless communication networks. The invention relates more particularly to the field of wireless communication networks in accordance with one of the IEEE 802.11 standards (*Institute of Electrical and Electronics Engineers*), that is to say the wireless communication networks commonly called Wi-Fi networks.

A wireless communication network (hereinafter "network") in accordance with one of the IEEE 802.11 standards typically comprises a so-called master electronic device, common referred to as an access point or AP, and a plurality of so-called client electronic devices able to establish wireless connections with the access point. The master electronic device, or access point, is typically a "box" supplied by an internet operator, that is to say a home gateway or residential gateway. Client electronic devices are typically computers, tablets or so-called smartphones. It is thus commonly said that the client electronic devices are connected or associated "in Wi-Fi" with the access point. The terms "Wi-Fi connection" or "Wi-Fi association" will be used hereinafter equivalently.

Figure 1:
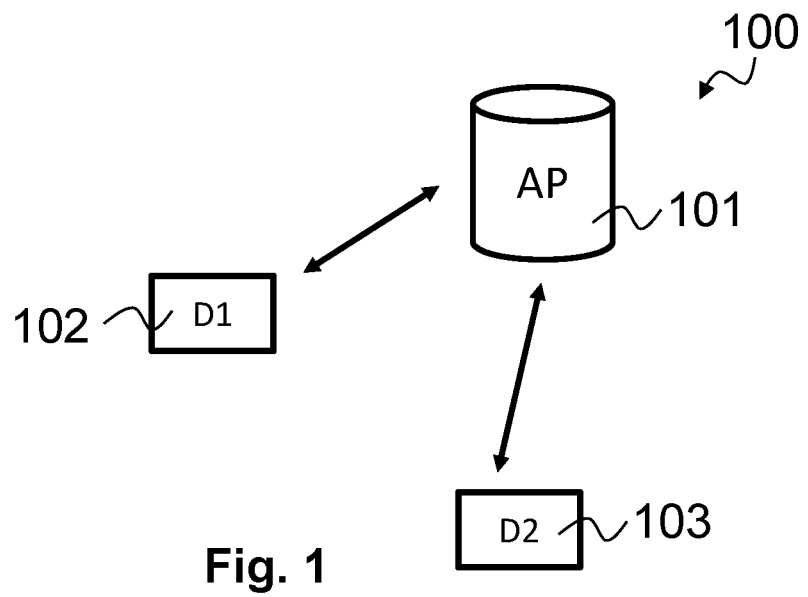

FIG. 1 illustrates highly schematically such a network 100. The network 100 comprises an access point AP 101 and two client electronic devices D1 102 and D2 103. According to the version of the IEEE 802.11 standard used by the various electronic devices in the network 100, a plurality of frequency bands can be used to establish radio connections between the client electronic devices and the access point AP 101. Thus the access point AP 101 may comprise one or more radio modules, each radio module being adapted for using a frequency band in the plurality of frequency bands allowing the establishment of a connection with a client electronic device. The client electronic device D1 102 or D2 103 comprises, to allow the establishment of a radio connection with the access point AP 101, a radio module for using one of the frequency bands used by one of the radio modules of the access point. Establishing a radio connection is therefore possible between the radio module of the client electronic device and the radio module of the access point using one and the same frequency band. A radio module may possibly use a plurality of frequency bands, but not simultaneously. The radio module must then switch between a plurality of modes, each mode corresponding to the use of one of the frequency bands that can be used by the radio module. A "dual-band/single radio" electronic device is then for example spoken of, for a client electronic device the radio module of which can use two frequency bands. Thus, if an access point AP 101 conventionally comprises a plurality of radio modules allowing the simultaneous establishment of radio connections with client electronic devices on a plurality of frequency bands, a client electronic device generally comprises only one radio module, possibly able to use one or more frequency bands. Methods then exist allowing a selection of the optimal frequency band for establishing a radio connection between the client electronic device and the access point.

Thus the management of wireless communication networks wherein an access point comprises a plurality of radio modules and each client electronic device one radio module, possibly able to use one or other of the frequency bands, is known. However, lately client electronic devices comprising two or more radio modules have appeared on the market. Where an access point also comprises at least two radio modules, these new client electronic devices then allow the establishment of more than one radio connection simultaneously between said client electronic device and the access point. When a radio connection is established with an access point, a client electronic device, or more precisely a radio module of said electronic client device, identifies itself with the access point by means of an address that is said to be physical, since it is associated with the radio module of the client electronic device. This physical address is typically an MAC (Media Access Control) address. Thus, from the point of view of the access point, each radio connection established by any one client electronic device to the access point is considered to be an independent radio connection, identified by a different physical address. In other words, the access point considers each radio connection thus established to be so many radio connections to an independent client electronic device, rather than a plurality of radio connections to one and the same client electronic device.

It is therefore necessary to propose a method for overcoming these drawbacks

The invention relates to a method, for a wireless communication network using a plurality of frequency bands and comprising at least one so-called client electronic device, each client electronic device comprising at least two radio modules, each radio module being adapted to use a frequency band in the plurality of frequency bands, and a so-called master electronic device, the master electronic device comprising at least two radio modules, each radio module being adapted to use a frequency band in the plurality of frequency bands, the method allowing the establishment of a plurality of connections between a client electronic device and the master electronic device, the method being executed by the master electronic device and comprising the steps of:

receiving, via a first radio module of the master electronic device and coming from a first radio module of a client electronic device, a message comprising a request to establish a first connection between the master electronic device and the client electronic device, the message comprising an identifier associated with the client electronic device and a first item of authentication information associated with the request to establish a connection, determining whether a second connection is already established between a second radio module of the master electronic device and a second radio module of the client electronic device corresponding to the identifier received, and, if such is the case, then:

sending, via the second radio module of the master electronic device and intended for the second radio module of the client electronic device, a message comprising a request to verify the request to establish the first connection received, the message comprising the first item of authentication information received, receiving, via the second radio module of the master electronic device and coming from the second radio module of the client electronic device, a message comprising information validating the request to establish the first connection, and establishing the first connection between the first radio module of the client electronic device and the first radio module of the master electronic device.

According to a complementary embodiment of the invention, the message comprising the validation information also comprises a second item of authentication information, the master electronic device sending a message to the client electronic device in order to establish the first connection, this message comprising the second item of authentication information.

According to a complementary embodiment of the invention, the wireless communication network being in accordance with an IEEE 802.11 standard, each radio module of the master electronic device sending a signalling message comprising at least one first and one second wireless network identifier, the second wireless network identifier being determined according to the first network identifier, the method is characterised in that each client electronic device wishing to establish a plurality of connections with the master electronic device establishes each connection using the second network identifier.

According to a complementary embodiment of the invention, the signalling message is:
   a beacon frame sent periodically, or
   a message sent in return after reception of a wireless-network detection message sent by a client electronic device.

According to a complementary embodiment of the invention, the method comprises a subsequent step of bonding the first radio connection with previously established connections, the bonding step comprising the steps of:
   updating a so-called bonding table, the table comprising, for each bonding, an associated identifier, the identifier associated with the client electronic device and a list of associated connections, and
   when a message is intended for the client electronic device, then:
      seeking, in the bonding table, the list of associated connections,
      determining a connection for sending the message,
      sending the message via the connection determined.

The invention also relates to a method, for a wireless communication network using a plurality of frequency bands and comprising at least one so-called client electronic device, each client electronic device comprising at least two radio modules, each radio module being adapted to use a frequency band in the plurality of frequency bands, and a so-called master electronic device, the master electronic device comprising at least two radio modules, each radio module being adapted to use a frequency band in the plurality of frequency bands, the method allowing the establishment of a plurality of connections between a client electronic device and the master electronic device, the method being executed by the client electronic device, a first connection being established between a first radio module of the client electronic device and a first radio module of the master electronic device, the method comprising the steps of:
   sending, via a second radio module of the client electronic device and to a second radio module of the master electronic device, a message comprising a request to establish a second connection, the message comprising an identifier associated with the client electronic device and a first item of authentication information associated with the connection establishment request,
   receiving, via the first radio module of the client electronic device and coming from the first radio module of the master electronic device, a message comprising a request to verify a request to establish a connection, the message comprising a second item of authentication information,
   determining whether the first item of authentication information is equal to the second item of authentication information and, if such is the case,
   sending, via the first radio module of the client electronic device and intended for the first radio module of the master electronic device, a message comprising information validating the request to establish the second connection, and
   establishing the second connection between the second radio module of the client electronic device and the second radio module of the master electronic device.

According to a complementary embodiment of the invention, the message comprising information validating the request to establish the second connection comprising in addition a second item of authentication information, the second connection between the second radio module of the client electronic device and the second radio module of the master electronic device is established only if the client electronic device receives a message requesting establishment of a connection of the master electronic device comprising the second item of authentication information.

According to a complementary embodiment of the invention, the wireless communication network being in accordance with an IEEE 802.11 standard, each radio module of the master electronic device sending a signalling message comprising at least one first and one second wireless network identifier, the second wireless network identifier being determined according to the first network identifier, the method is characterised in that each client electronic device wishing to establish a plurality of connections with the master electronic device establishes each connection using the second network identifier.

The invention also relates to a so-called master electronic device, the master electronic device being adapted for being connected to a wireless communication network using a plurality of frequency bands and comprising at least one so-called client electronic device, each client electronic device comprising at least two radio modules, each radio module being adapted to use a frequency band in the plurality of frequency bands, the master electronic device comprising at least two radio modules, each radio module being adapted for using a frequency band in the plurality of frequency bands, the master electronic device being adapted for:
   receiving, via a first radio module of the master electronic device and coming from a first radio module of a client electronic device, a message comprising a request to establish a first connection between the master electronic device and the client electronic device, the message comprising an identifier associated with the client electronic device and a first item of authentication information associated with the request to establish a connection,
   determining whether a second connection is already established between a second radio module of the master electronic device and a second radio module of the client electronic device corresponding to the identifier received, and, if such is the case, then:
      sending, via the second radio module of the master electronic device and intended for the second radio module of the client electronic device, a message comprising a request to verify the request to establish the first connection received, the message comprising the first item of authentication information received,
      receiving, via the second radio module of the master electronic device and coming from the second radio module of the client electronic device, a message comprising information validating the request to establish the first connection, and establishing the first connection between the first radio module of the client electronic device and the first radio module of the master electronic device.

The invention also relates to a so-called client electronic device, the client electronic device being adapted to be connected to a wireless communication network using a plurality of frequency bands and comprising a so-called master electronic device, each master electronic device comprising at least two radio modules, each radio module being adapted to use a frequency band in the plurality of frequency bands, the client electronic device comprising at least two radio modules, each radio module being adapted to use a frequency band in the plurality of frequency bands, the client electronic device being adapted, when a first connection is established between a first radio module of the client electronic device and a first radio module of the master electronic device, to:

send, via a second radio module of the client electronic device and to a second radio module of the master electronic device, a message comprising a request to establish a second connection, the message comprising an identifier associated with the client electronic device and a first item of authentication information associated with the connection establishment request, receive, via the first radio module of the client electronic device and coming from the first radio module of the master electronic device, a message comprising a request for verification of a request to establish a connection, the message comprising a second item of authentication information, determine whether the first item of authentication information is equal to the second item of authentication information and, if such is the case, send, via the first radio module of the client electronic device and intended for the first radio module of the master electronic device, a message comprising information validating the request to establish the second connection, and establish the second connection between the second radio module and the client electronic device and the second radio module of the master electronic device.

The invention also relates to a computer program that can be stored on a medium and/or downloaded from a communication network, in order to be read by a processor of a so-called master electronic device of a wireless communication network. This computer program comprises instructions for implementing all or some of the steps of the method for establishing a plurality of connections between a client electronic device and the master electronic device, when said program is executed by the processor.

The invention also relates to an information storage medium or recording medium comprising such a computer program.

The invention also relates to a computer program that can be stored on a medium and/or downloaded from a communication network, in order to be read by a processor of a so-called client electronic device of a wireless communication network. This computer program comprises instructions for implementing all or some of the steps of the method for establishing a plurality of connections between the client electronic device and a master electronic device, when said program is executed by the processor.

The invention also relates to an information storage medium or recording medium comprising such a computer program.

Figure 2:
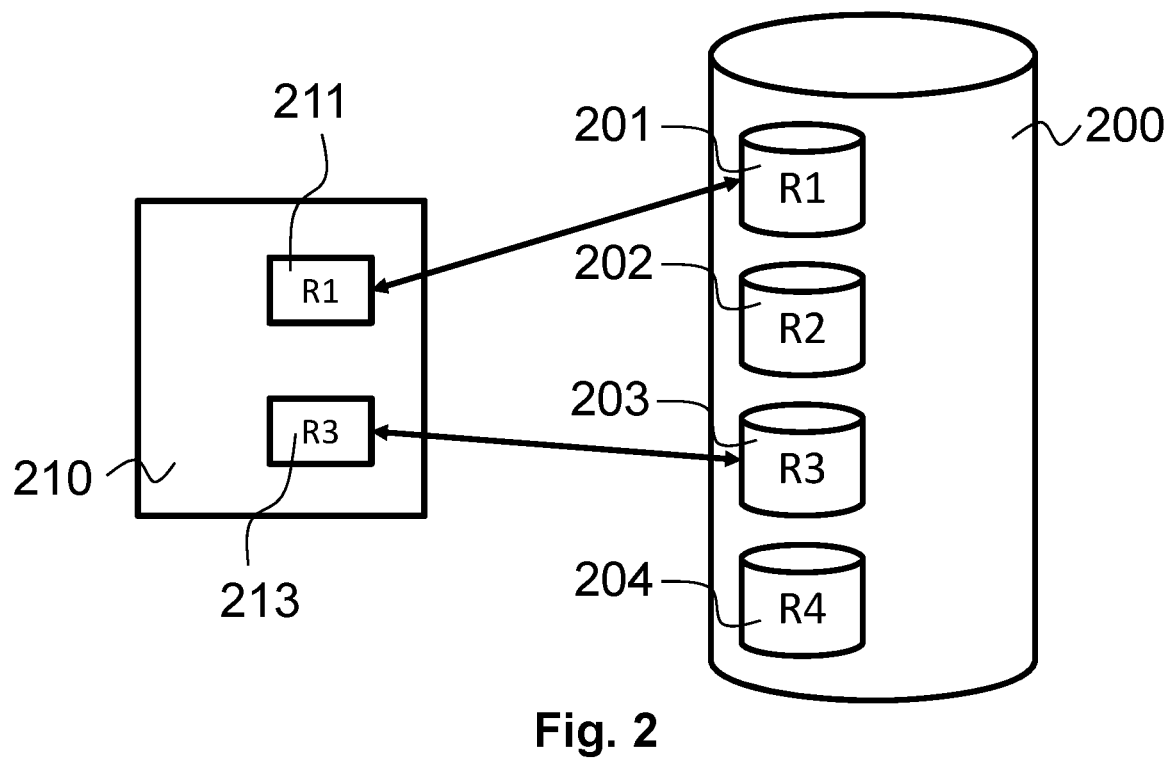
Figure 3:
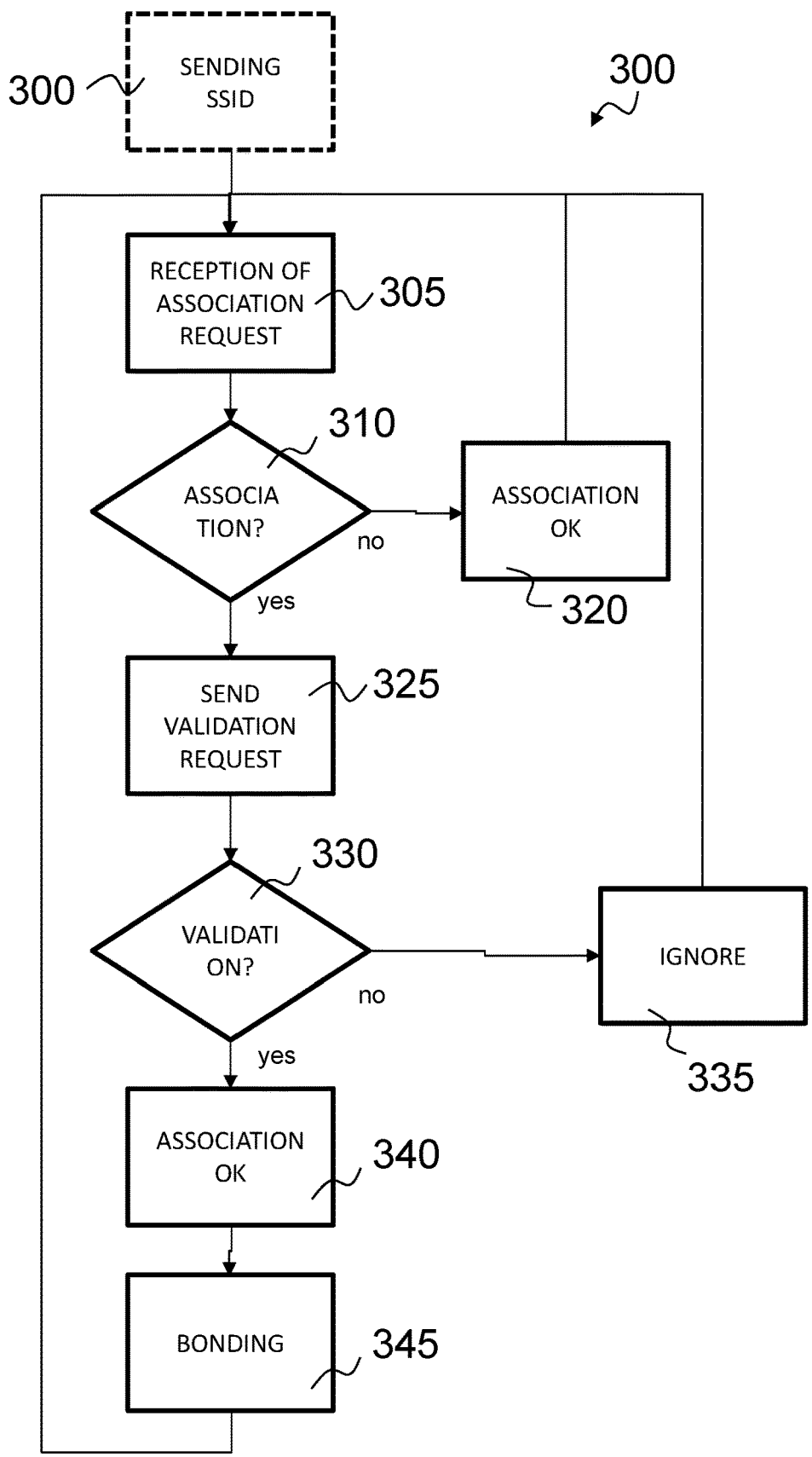
Figure 4:
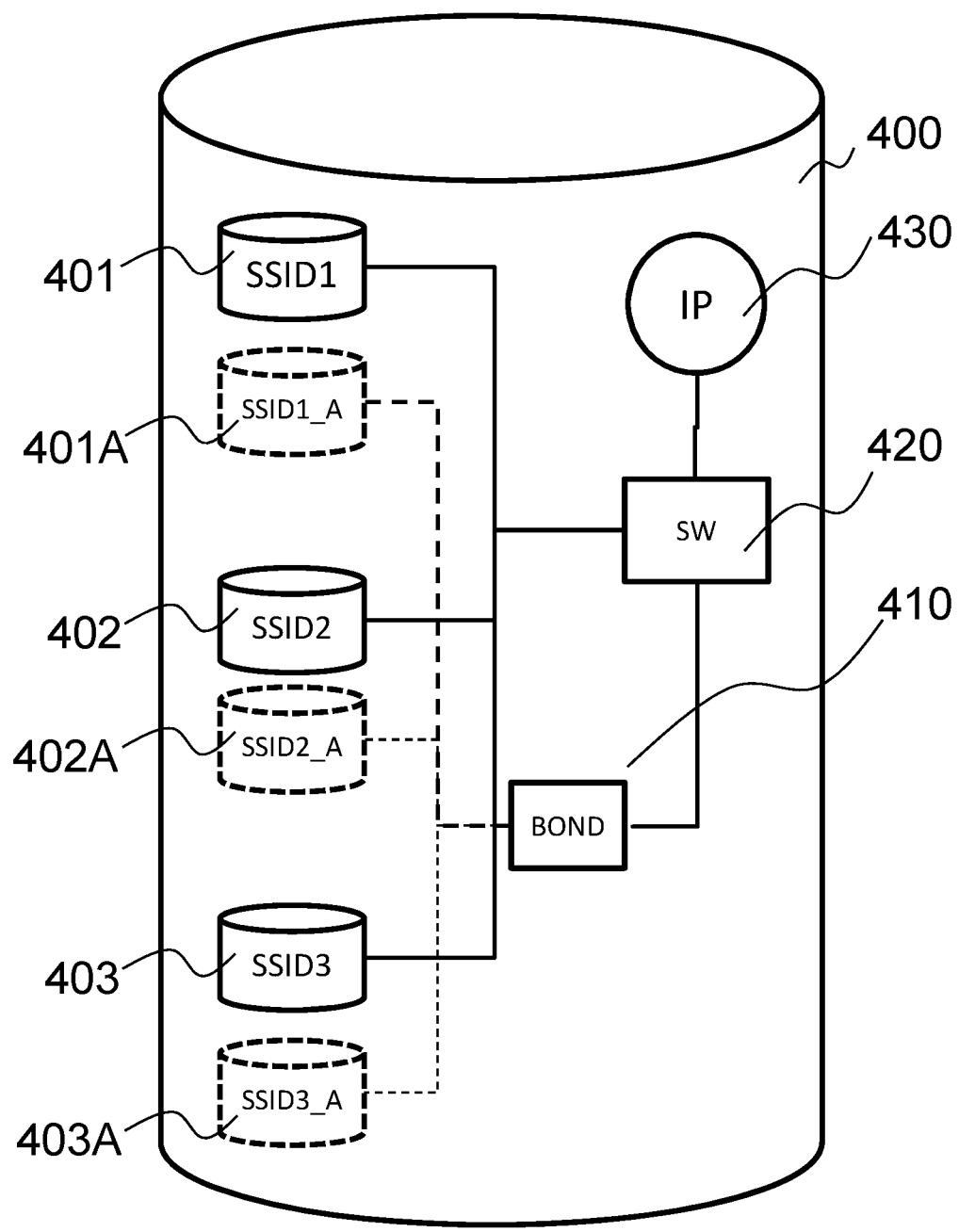
Figure 5:
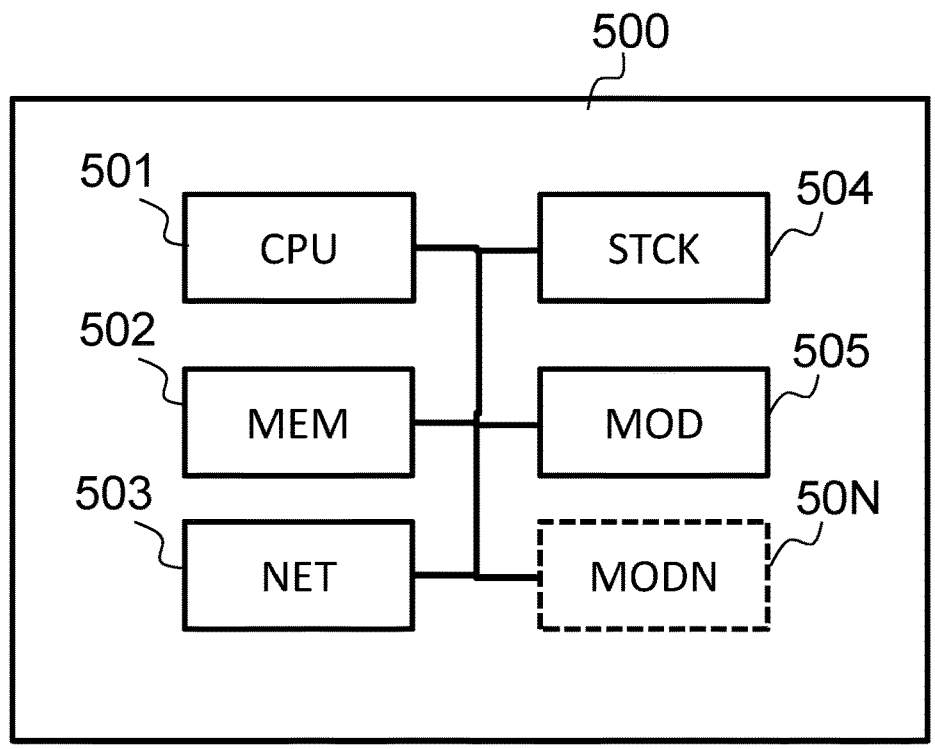
Figure 6:
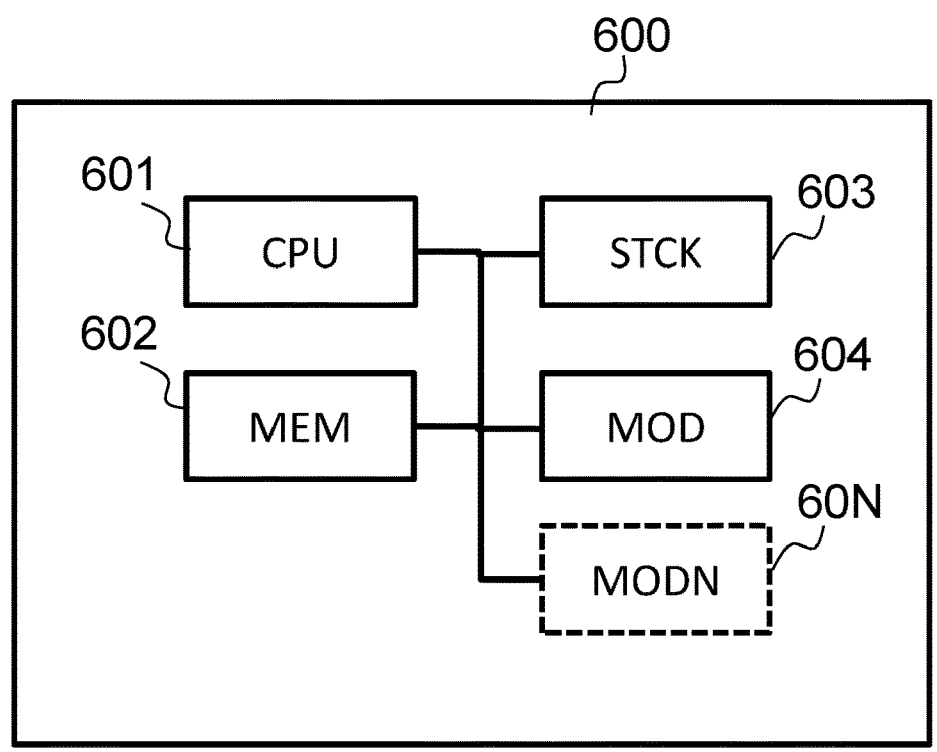

The features of the invention mentioned above, as well as others, will emerge more clearly from a reading of the following description of an example embodiment, said description being given in relation to the accompanying drawings, among which:

FIG. 1 illustrates schematically a wireless communication network comprising a plurality of client electronic devices and a master electronic device, or access point, for example in accordance with an IEEE 802.11 standard, FIG. 2 illustrates schematically a client electronic device and a master electronic device, or access point, according to one embodiment of the invention, FIG. 3 illustrates schematically the steps of the method for establishing a plurality of connections between a client electronic device and a master electronic device of a wireless communication network, according to one embodiment of the invention, FIG. 4 illustrates schematically the functional architecture of a so-called master electronic device of a wireless communication network according to one embodiment of the invention, FIG. 5 illustrates schematically the hardware architecture of a so-called master electronic device, or access point, of a wireless communication network, the master electronic device being adapted to establish a plurality of radio connections with a client electronic device, according to one embodiment of the invention, FIG. 6 illustrates schematically the hardware architecture of a so-called client electronic device of a wireless communication network, the client electronic device being adapted to establish a plurality of radio connections with a master electronic device, or access point, according to one embodiment of the invention.

The invention enables a master electronic device, or access point, of a wireless communication network to be able to detect when a client electronic device is seeking to establish a plurality of radio connections with it. In particular, information for identifying—uniquely—a client electronic device is integrated in frames establishing a radio connection. Thus the access point can determine the radio connections established corresponding to one and the same client electronic device.

The invention makes it possible to verify, when a new radio connection is established between a client electronic device and an access point, that the establishment request does indeed come from the same client electronic device. For this purpose the invention proposes a check on a request to establish a new radio connection through a first radio connection previously established. The invention thus affords protection against identity theft or replay attacks.

The invention makes it possible to group together, or bond, various radio connections established between a client electronic device and an access point, the grouping being formed at the "data link" of the OSI (Open Systems Interconnection) layer. More precisely, the grouping, or bonding, is performed at the MAC layer of a protocol in accordance with IEEE 802.11. The bonding method according to the invention then allows a distribution of the network load between the various radio connections to the same client electronic device. In other words, downlink network traffic, that is to say data frames sent by the access point to the client electronic device, can be transmitted using one or other of the connections in the plurality of radio connections established to this client electronic device, as explained below. A conventional bonding may also be established in the uplink direction, that is to say for data frames sent by the client electronic device to the access point.

FIG. 2 illustrates schematically a client electronic device 210 and a master electronic device 200, or access point 200, according to one embodiment of the invention. The client electronic device 210 may be one of the client electronic devices D1 102 or D2 103 in the network 100, when said client electronic device comprises at least two radio modules and implements the method of the invention. Likewise, the master electronic device 200 may be the master electronic device 101, when said master electronic device implements the method of the invention. The client electronic device 210 here comprises two radio modules R1 211 and R3 213. By convention, the term R1 and respectively R3 refers to the frequency band used by the radio module 211 or 213. The client electronic device 210 may possibly comprise more than two radio modules, or each radio module may use, not simultaneously, a plurality of frequency bands. The master electronic device, or access point, 200 here comprises four radio modules R1 201, R2 202, R3 203 and R4 204. The convention R1, R2, R3 and R4 is the same as before, and the radio module 211 of the client electronic device can therefore potentially establish a radio connection with the radio module 201 of the master electronic device since they use the same frequency band R1. The same reasoning applies for the radio modules 213 and 204, with the use of the frequency band R3. Thus, as illustrated, two radio connections have been established between the client electronic device 210 and the master electronic device 200. A first radio connection, on the frequency band R1, between the radio module 211 of the client electronic device 210 and the radio module 201 of the master electronic device 200. A second radio connection, on the frequency band R3, between the radio module 213 of the client electronic device 210 and the radio module 203 of the master electronic device 200. The method disclosed below (FIG. 3) ultimately makes it possible to aggregate these two connections.

FIG. 3 illustrates schematically the steps of a method 300 for establishing a plurality of connections between a client electronic device, possibly the electronic device 210 in FIG. 2, and a master electronic device, possibly the master electronic device 200 in FIG. 2, in a wireless communication network, according to one embodiment of the invention.

In order to be able more easily to isolate the radio connections corresponding to radio connections to an isolated client electronic device and those corresponding to radio connections to one and the same client electronic device, it is advantageously proposed that the master electronic device, or more precisely each of the radio modules thereof, uses at least two wireless networks. In other words, for a wireless network in accordance with IEEE 802.11, each radio module of the master electronic device uses two wireless networks, each network being associated with a different SSID (Service Set Identifier). The two SSIDs can therefore in principle be used by a client electronic device for establishing a connection. Advantageously, the second SSID corresponds to a wireless network that is a duplication of the wireless network corresponding to the first SSID. Duplication means that the technical characteristics of each wireless network, except for the SSID and those discussed below, are identical. In other words, the master electronic device defines, for each radio module, that is to say for each physical interface, two so-called virtual network interfaces, each virtual network interface corresponding to a different SSID. Advantageously, a first wireless network corresponding to the first SSID is managed conventionally, whereas the second wireless network, corresponding to the second SSID, is managed according to the method described below according to the invention. This makes it possible for example to distinguish a first virtual network interface, that is to say a first SSID, dedicated to the client electronic devices not implementing the invention or not wishing to establish bonding of radio connections, and a second virtual network interface, that is to say a second SSID, dedicated to the client electronic devices using the radio-connection bonding method that is the object of the invention.

According to one embodiment of the invention, the second SSID is said to be "hidden", that is to say it is not broadcast by the master electronic device. This second SSID may take a predetermined form, dependent on the form of the first SSID. Thus, for example, each radio module of a master electronic device implementing the invention can broadcast a first SSID named "NETNAME" intended for the client electronic devices not implementing the invention and use a second SSID, named "NETNAME_AG", constructed from the name of the first SSID in a predetermined fashion (hereby adding the character string "_AG"). Thus the client electronic devices can use the SSID "NETNAME_AG", predetermined according to the name of the first wireless network "NETNAME", whereas the SSID "NETNAME_AG" is not broadcast by the master electronic device. This embodiment corresponds to the non-broadcasting in a signalling message, referred to as Wi-Fi beacon frame, of the SSID corresponding to the second wireless network.

According to a complementary embodiment, each client electronic device can send a so-called "probe request" frame to the master electronic device in order to know the SSIDs that can be used. In this case, the master electronic device can respond to the "probe request" frame with a so-called "probe response" frame, said "probe response" frame comprising the first and second SSIDs. According to an alternative embodiment of the invention, a client electronic device implementing the invention sends a "probe request" frame comprising supplementary information indicating that the client electronic device is compatible with the method of the invention. In this case, the master electronic device responds by means of a "probe response□ frame comprising the second SSID. In the contrary case, the master electronic device responds with a "probe response" frame comprising the first SSID. Thus the invention can be implemented in a way that is transparent for client electronic devices comprising only a single radio module.

In the end, the client electronic devices implementing the invention are isolated on the wireless network corresponding to the second SSID.

Thus, according to the various embodiments described above, in a first step 300 each of the radio modules of the master electronic device comprises a virtual interface corresponding to an SSID dedicated to the connection of the client electronic devices implementing the invention. In other words, the master electronic device, or access point, uses an SSID, hidden or not, for the connection of the electronic devices wishing to establish a plurality of radio connections with the access point.

In a following step 305, the master electronic device, or access point, receives, via a first radio module of the master electronic device and coming from a first radio module of a client electronic device, a message comprising a request to establish a first connection between the master electronic device and the client electronic device, the message comprising an identifier associated with the client electronic device and a first item of authentication information associated with the connection-establishment request. This message is a so-called "association request" message as defined in an IEEE 802.11 protocol, comprising a unique identifier of the client electronic device and a first item of authentication information associated with the connection request. According to one embodiment of the invention, the message may also comprise, in addition to the identifier of the client electronic device, a bonding identifier, that is to say an identifier of a grouping, existing or not, of radio connections. The latter embodiment thus enables one and the same client electronic device to manage a plurality of radio connections possibly grouped in various bondings.

The supplementary information may be included in a so-called "vendor specific" field, which makes it possible to guarantee compatibility of a client electronic device implementing the invention with an access point not implementing the invention.

The master electronic device receiving the message records in a memory the information included in the message. For example, the master electronic device keeps up to date a so-called "association table" associating the identifier of the client electronic device, possibly a bonding identifier, an MAC address associated with a first radio module of the master electronic device receiving the message and an indication of the establishment or not of a connection. An association corresponds to a radio connection established between the master electronic device and the client electronic device. According to one embodiment, the association table comprises supplementary information for identifying a master electronic device. The latter case corresponds to a client electronic device that establishes a plurality of radio connections with a plurality of master electronic devices, each master electronic device being able to exchange information with the other master electronic devices. This makes it possible to define a scenario of distributed bonding of the radio connections. The table is in this case kept up to date either by a specific master electronic device or in a distributed fashion.

In a following step 310, the master electronic device determines whether a second connection is already established between a second radio module of the master electronic device and a second radio module of the client electronic device corresponding to the identifier received. In other words, the master electronic device checks whether there already exists a radio connection established between the client electronic device and the master electronic device.

In a step 320, if there does not already exist an established radio connection, the master electronic device sends a so-called "association response" message in a conventional manner and then establishes a radio connection with the client electronic device. The establishment of the radio connection may comprise subsequent authentication steps, not described here, of the WPA/WPA2 type ("Wi-Fi Protected Access"). At the end of this step, a radio connection is established between the client electronic device and the master electronic device. The electronic device may listen out for a frame of the "association request" type, that is to say awaiting a new step 305.

In a step 325, if there already exists a radio connection established between the master electronic device and the client electronic device, the master electronic device sends, via the second radio module of the master electronic device and to the second radio module of the client electronic device, a message comprising a request to verify the request for establishment of the first connection received, the message comprising the first item of authentication information received. In other words, the master electronic device sends to the client electronic device, but through the radio connection previously established, a verification message comprising the first item of authentication information received.

The client electronic device therefore receives said verification message. If the client electronic device is indeed the origin of the request to establish a new radio connection via the first radio module thereof, then the client electronic device can verify that the first item of authentication information received does indeed correspond to the one that it had initially sent in the message received in the step 305 by the master electronic device. If the client electronic device is no longer the origin of the request, the first item of authentication information will not correspond. For this reason, the first item of authentication information is chosen by the client electronic device randomly or pseudorandomly, the first item of authentication information having to vary over time in order to thwart a replay attack. The first item of authentication information is advantageously a nonce, that is to say an arbitrary number intended to be used only once. According to one embodiment of the invention, the first item of authentication information is determined randomly for each request to establish a radio connection. According to one embodiment of the invention, the first item of authentication information is determined according to a timestamp, to information related to the radio module, for example the MAC address thereof, and to the identifier of the client electronic device. The first item of authentication information may be a condensing of the previous information.

If the client electronic device is the origin of a new request to establish a connection and the first item of authentication information corresponds to the one sent by the client electronic device, then the client electronic device in return sends to the master electronic device a message comprising information validating the request. In the contrary case, the client electronic device does not respond or sends a message comprising non-validation information.

According to a complementary embodiment of the invention, said to be with "mutual authentication", the message comprising information validating the request sent by the client electronic device also comprises a second item of authentication information. This second item of authentication information is advantageously intended to thwart any attack by identity theft in the case where an attacker managed to predict an identifier of the bonding before a first association.

In a step 330, the master electronic device receives, via the second radio module of the master electronic device and coming from the second radio module of the client electronic device, a message comprising information validating the request to establish the first connection. If the validation information is positive, that is to say confirms that the client electronic device is the origin of the request to establish the new radio connection, then the master electronic device passes to the step 340. In the contrary case, or in the absence of a response within a predetermined time, the master electronic device passes to the step 335.

The step 335 corresponds to the case where the master electronic device does not receive a response or a response indicating that the client electronic device is not the origin of the request to establish the new radio connection. In this case, the request to establish the new radio connection is rejected, for example via a message of the "association response" type indicating refusal of the radio connection. The electronic device can then once again listen out for a frame of the "association request" type, that is to say awaiting a new step 305.

Step 340 corresponds to the case where the client electronic device, via a previously established connection, has confirmed that it was indeed the origin of the request to establish a new radio connection. The master electronic device can therefore continue the method for establishing a radio connection between the first radio module of the client electronic device and the first radio module of the master electronic device. Thus a so-called "association response" frame is sent by the master electronic device to the client electronic device by the first radio module. If during the step 325, and in accordance with the embodiment of the invention known as "mutual authentication", the electronic device incorporated in the validation message a second item of authentication information, then the master electronic device incorporates this same second item of authentication information in the so-called "association response" frame. Thus, according to this complementary so-called "mutual authentication" embodiment, the client device receiving the so-called "association response" frame comprising the second item of authentication information can verify that the second item of authentication information received does indeed correspond to the one sent during the step 325. According to this embodiment, in the event of non-correspondence, or in the absence of the second item of authentication information, the client electronic device can refuse establishment of the connection with the master electronic device. The client electronic device can send a message requesting cancellation of the association to the master electronic device.

The association table is updated by the master electronic device with the information corresponding to this new radio connection.

In a step 345, the master electronic device can bond the various radio connections to one and the same client electronic device. This bonding is described for example in FIG. 4.

FIG. 4 illustrates schematically the functional architecture of a so-called master electronic device 400 of a wireless communication network according to one embodiment of the invention. The master electronic device 400 may be the master electronic device 200 described in FIG. 2 or the one implementing the method described in FIG. 3.

The master electronic device 400 comprises here three radio modules, the first using for example a frequency band R1, the second radio module using for example a frequency band R2 and the third radio module using for example a frequency band R3. The first radio module comprises a virtual interface 401, corresponding to a conventional wireless network (for example the one corresponding to the first SSID described in FIG. 3). The virtual interface 401 corresponds for example to the broadcasting of the SSID called "SSID1". The first radio module also comprises a virtual network interface 401A, possibly "hidden", corresponding for example to the broadcasting of the SSID called "SSID1_A". An MAC address is associated with each virtual interface.

Each interface 401, 402 and 403 is directly connected to a switching module 420 ("switch" or "bridge"). The switching module 420 is possibly connected to a routing module 430. Interfaces, not shown in FIG. 4, may be connected to the switching module 420, for example interfaces of the "Ethernet" or xDSL ("xDigital subscriber line") type enabling the master electronic device to be connected to a local area network and/or to the internet.

The interfaces 401A, 402A and 403A are bonded through a virtual so-called bonding interface 410, the bonding interface being associated itself with a so-called bonding MAC address. Thus all the multiple radio connections established by client electronic devices are attached to the interfaces 401A, 402A and 403A, and are in the end attached to the virtual bonding interface 410.

The conventional bonding methods, for example, are known in the field of Ethernet interface bonding and cannot be directly used in the present case. This is because a client electronic device may have established radio connections with the interface 401A and the interface 402A, but not necessarily with the interface 403A. However, the conventional methods for sending a frame to the client electronic device could choose an interface at random between the interfaces 401A, 402A and 403A. The frames sent through the interface 403A would therefore be lost.

In order to overcome these drawbacks, the master electronic device records in a memory a so-called association table. This table is updated when the method described in FIG. 3 is executed, for example during the step 340. This association table comprises, for each connection of the client electronic device:
    an identifier associated with the connection,
    an identifier of the client electronic device with which the connection is established,
    possibly, if this option is used by the client electronic device, a bonding identifier,
    an identifier of the virtual radio interface relating to this connection (for example one of the interfaces 401A, 402A, 403A in FIG. 4).

It should be noted that, in parallel, each client electronic device, when a bonding of a plurality of radio connections is in place, comprises:
    for each radio connection established, an interface with which an MAC address is associated,
    a virtual so-called bonding interface, grouping together the previous interfaces, the virtual bonding interface being associated with a so-called bonding MAC address,
    possibly, if the client electronic device uses this option, a bonding identifier, the client electronic device then being able to manage a plurality of bondings in parallel,
    the master electronic device also records in a memory a so-called bonding table, updated by the master electronic device at each reception of a (learning) data frame, and comprising, for each identifier of a client electronic device or, if the bonding information option is used, for each pair consisting of identifier of a client electronic device and bonding information, a list of MAC addresses populated by learning and accessible through the bonding interfaces. These entries are of the so-called "lower layer" type,
    an entry of the so-called "upper layer" type comprising a list of MAC addresses also populated by learning and accessible through the switching function (non-bonding interfaces).

In other words, from the point of view of the bonding module 410 in FIG. 4, the entries in the bonding table corresponding to electronic devices the frames of which are received via one of the interfaces 401A, 402A or 403A are said to be "lower layer" entries. Likewise, the entries in the bonding table corresponding to electronic devices the frames of which are received via the routing module 430 and/or the interfaces 401, 402 or 403, are said to be "upper layer" entries.

A so-called "learning" method, making it possible to populate, that is to say to fill in, the so-called bonding table is described below. This method, executed by the master electronic device, also allows the management of any electronic devices connected to the client electronic device. This is particularly advantageous for a client electronic device of the "Wi-Fi repeater" type.

Two processes are defined, a first so-called "reception" process, and a second so-called "transmission" process.

The first so-called "reception" process is implemented:
    at the time of reception by the master electronic device of a frame intended for a virtual so-called bonding interface, for example the interface 410, the frame having been received via one of the interfaces able to be potentially bonded of the master electronic device (corresponding to the so-called "lower layer" entries); the so-called "lower layer" interfaces of a master electronic device conventionally correspond to Wi-Fi interfaces.

at the time of the reception of a frame intended for a virtual so-called bonding interface, the frame having been received via an upper layer.

The second so-called "transmission" process is implemented at the time of transmission of a frame from a virtual so-called bonding interface, whether it be intended for a so-called "lower layer" or "upper layer" entry, the transmissions to the entries of the "lower layer" and "upper layer" type being able to be the subject of a distinct dedicated sub-process.

The so-called association table and the so-called bonding table are synchronised. This is because, when an entry is added in the so-called association table, a corresponding entry of the "lower layer" type is created in the bonding table, containing the identifiers of the client electronic device and possibly, if this option is used by the client electronic device, the bonding identifier coming from the corresponding entry in the association table, the list of MAC addresses associated with this entry being initially empty. Likewise, if an entry is deleted from the association table, the corresponding entry of the "lower layer" type is also deleted in the so-called bonding table, as well as the associated list of MAC addresses. If an identifier of an electronic device or of a bonding is modified in the association table, then the same modification is made in the so-called bonding table.

A method for receiving a frame according to one embodiment of the invention is described below, this method may be implemented by the bonding module 410.

Should the frame received come from a so-called "lower layer" entry, then:
(a) if the frame is received via a connection, or Wi-Fi association, of the bonding type, then the frame is redirected to the associated virtual network interface,
(b) if the frame is received via a virtual network interface, then the identifier of the sending client electronic device and if applicable a bonding identifier are added to this frame, and then the modified frame is sent to the virtual so-called bonding interface 410,
(c) if the frame, for example of so-called level 2, is received via the virtual so-called bonding interface 410, then:
the bonding table is updated:
the entry of the "lower layer" type corresponding to the identifier of the client electronic device is sought in the table and, if not already present, the MAC address that is the source of the frame is added to the list associated with the entry, and
the MAC address that is the source of the frame is sought in the table and, if it is present in another list associated with an entry other than the previous entry, it is then deleted from the other list,
if the frame is of the "unicast" type, then:
if an entry is sought in the table corresponding to the MAC address that is the destination of the frame,
if the entry found is of the "upper layer" type, then the frame is sent to the process of sending to a so-called «upper layer» electronic device,
if the entry found is of the «lower layer» type, then the frame is sent to the process of sending to a so-called «lower layer» electronic device,
if no entry is identified, then the frame is treated as being of the «multicast or broadcast» type, as explained below,
if the frame is of the «multicast or broadcast» type, then:
the frame is sent to the process of sending to the "lower layer" entries,
if the frame does not comprise any information of the "upper layer" type, then the frame is duplicated, the duplicated frame being sent to the process of transmission to the "upper layer" entries.

Should the frame received come from a so-called "upper layer" entry, and if the frame is received on the virtual so-called bonding interface 410, then:
the frame is enhanced with information of the "upper layer" type making it possible to distinguish this frame from a frame coming from a "lower layer" entry,
the bonding table is updated:
by adding the source MAC address of the frame in the list of MAC addresses associated with the corresponding entry (of the "upper layer" type),
by seeking the source MAC address of the frame in the other entries in the table, and, if present, then eliminating it in the list of MAC addresses associated with the other entries;
the remainder of the process is identical to the case of a frame coming from a so-called "lower layer" electronic address: the frame is treated as in the previous case as from case (c) "if the frame, for example of so-called level 2, is received via the virtual so-called bonding interface 410".

A method for sending a frame according to one embodiment of the invention is described below, this method can be implemented by the bonding module 410.

In the case of the sending of a frame intended for an MAC address of an electronic device corresponding to an entry of the "lower layer" type:
for a so-called level 2 frame of the "unicast" type:
seeking an entry in the bonding table corresponding to the destination MAC address of the frame and, if an entry is found:
determining all the associations (or connections) corresponding to the bonding found, and then transmitting this information found, as well as the frame to be transmitted, to a standard bonding function corresponding to the prior art so that the latter determines the association to be used for sending the frame,
the identifier of the association to be used for sending the frame is added to this frame,
the frame thus modified is next sent to the virtual network interface corresponding to the association to be used for sending it,
if no entry is found, then the frame is treated as a "multicast or broadcast" frame (cf. below),
for a so-called level 2 frame of the "multicast or broadcast" type:
for each existing bonding, with the exception of any bonding from which the frame comes:
duplicating the frame to be sent in order to repeat the steps below for each existing bonding,
seeking all the associations (or connections) associated with the bonding and then transmitting this information found, as well as the frame to be sent, to a standard bonding function corresponding to the prior art so that the latter determines the association to be used for sending the frame, the identifier of the association to be used for sending the frame is added to this frame, and the frame thus modified is next sent to the virtual network interface corresponding to the association to be used for sending it.

If one or more virtual network interfaces receive a frame coming from the virtual so-called bonding interface 410, then this frame is sent solely on the association (or connection) designated by the identifier present in the frame of the association to be used.

In the case of the sending of a frame to an MAC address of an electronic device corresponding to an entry of the "upper layer" type:

if the frame comprises information of the "upper layer" type, it is ignored, otherwise the frame is sent to the upper layer, that is to say for example to the routing module 430.

FIG. 5 illustrates schematically the hardware architecture of a so-called master electronic device 500, or access point, of a wireless communication network, the master electronic device 500 being adapted to establish a plurality of radio connections with a client electronic device, according to one embodiment of the invention. The master electronic device 500 is for example the master electronic device 200 in FIG. 2.

The master electronic device 500 is adapted to implement the method, for a wireless communication network using a plurality of frequency bands and comprising at least one so-called client electronic device, each client electronic device comprising at least two radio modules, each radio module being adapted to use a frequency band in the plurality of frequency bands, each radio module being adapted to use a frequency band in the plurality of frequency bands, the method allowing the establishment of a plurality of connections between a client electronic device and the master electronic device. The method is executed by the master electronic device and comprising the steps of:

receiving, via a first radio module of the master electronic device and coming from a first radio module of a client electronic device, a message comprising a request to establish a first connection between the master electronic device and the client electronic device, the message comprising an identifier associated with the client electronic device and authentication information associated with the request to establish a connection, determining whether a second connection is already established between a second radio module of the master electronic device and a second radio module of the client electronic device corresponding to the identifier received, and, if such is the case, then:

sending, via the second radio module of the master electronic device and intended for the second radio module of the client electronic device, a message comprising a request to verify the request to establish the first connection received, the message comprising the first item of authentication information received, receiving, via the second radio module of the master electronic device and coming from the second radio module of the client electronic device, a message comprising information validating the request to establish the first connection, and establishing the first connection between the first radio module of the client electronic device and the first radio module of the master electronic device.

Thus the master electronic device 500 comprises, connected by a communication bus: a processor CPU (central processing unit) 501; a memory MEM 502 of the RAM type (random access memory) and/or ROM type (read only memory), a network module NET 503, a storage module STK 504 of the internal storage type and possibly a plurality of radio modules 305 to 30N possibly using a plurality of frequency bands. The storage module STCK 504 may be of the hard disk type HDD (hard disk drive) or SSD (solid-state drive), or of the external storage medium reader type, such as an SD (Secure Digital) card reader. The processor CPU 501 can record data, or information, in the memory MEM 502 or in the storage module STCK 504. The processor CPU 501 can read data recorded in the memory MEM 502 or in the storage module STCK 504. These data may correspond to configuration parameters, instructions, to the association table or to the bonding table previously described. The network module NET 503 allows connection of the master electronic device 500 to a local area network and/or the internet. Each radio module 505 to 50N enables the master electronic device 500 to send, and respectively to receive, messages or frames intended for and respectively coming from one or more client electronic devices, said client electronic devices having established a radio connection with said radio module 505 to 50N.

The processor CPU 501 is capable of executing instructions loaded in the memory MEM 502, for example from the storage module STCK 504 or via the network module NET 503. When the master electronic device 500 is powered up, the processor CPU 501 is capable of reading instructions from the memory MEM 502 and executing them. These instructions form a computer program causing the implementation, by the processor CPU 501, of all or some of the methods and steps described above, particularly the method described in FIG. 2. Thus all or some of the methods and steps described above can be implemented in software form by the execution of a set of instructions by a programmable machine, such as a DSP (digital signal processor) or a microcontroller. All or some of the methods and steps described here may also be implemented in hardware form by a machine or a dedicated component, such as an FPGA (field-programmable gate array) or an ASIC (application-specific integrated circuit). The functions of the master electronic device 500 can be integrated in an access point of a wireless network in accordance with an IEEE 802.11 standard by updating software, that is to say by updating the microprogram ("firmware") of the master electronic device 500.

FIG. 6 illustrates schematically the hardware architecture of a so-called client electronic device 600 of a wireless communication network, the client electronic device 600 being adapted to establish a plurality of radio connections with a master electronic device, or access point, according to one embodiment of the invention. The client electronic device 600 is for example the client electronic device 210 in FIG. 2.

The client electronic device 600 is adapted to implement a method, for a wireless communication network using a plurality of frequency bands and comprising at least the so-called client electronic device and a so-called master electronic device, the master electronic device comprising at least two radio modules, each radio module being adapted to use a frequency band in the plurality of frequency bands, the so-called master electronic device being for example the one described in FIG. 4 or 5, the method allowing the establishment of a plurality of connections between the client electronic device and the master electronic device. The method is executed by the client electronic device, a first connection being established between a first radio module of the client electronic device and a first radio module of the master electronic device, the method comprising the steps of:

sending, via a second radio module of the client electronic device and to a second radio module of the master electronic device, a message comprising a request to establish a second connection, the message comprising an identifier associated with the client electronic device and a first item of authentication information associated with the connection establishment request, receiving, via the first radio module of the client electronic device and coming from the first radio module of the master electronic device, a message comprising a request for verification of a request to establish a connection, the message comprising a second item of authentication information, determining whether the first item of authentication information is equal to the second item of authentication information and, if such is the case, sending, via the first radio module of the client electronic device and intended for the first radio module of the master electronic device, a message comprising information validating the request to establish the second connection, and establishing the second connection between the second radio module and the client electronic device and the second radio module of the master electronic device.

Thus the client electronic device 600 comprises, connected by a communication bus: a processor or CPU (central processing unit) 601; a memory MEM 602 of the RAM type (random access memory) and/or ROM type (read only memory), a storage module STCK 603 of the internal storage type and possibly a plurality of radio modules 604 to 60N using possibly a plurality of frequency bands. The storage module STCK 603 may be of the hard disk type HDD (hard disk drive) or SSD (solid-state drive), or of the external storage medium reader type, such as an SD (Secure Digital) card reader. The processor CPU 601 can record data, or information, in the memory MEM 602 or in the storage module STCK 603. The processor CPU 601 can read data recorded in the memory MEM 602 or in the storage module STCK 603. These data may correspond to configuration parameters or instructions. Each radio module 604 to 60N enables the client electronic device 600 to send, and respectively to receive, messages or frames intended for, and respectively coming from one or more master electronic devices, said master electronic devices having established a radio connection with said radio module 604 to 60N.

The processor CPU 601 is capable of executing instructions loaded in the memory MEM 602, for example from the storage module STCK 603. When the client electronic device 600 is powered up, the processor CPU 601 is capable of reading instructions from the memory MEM 602 and executing them. These instructions form a computer program causing the implementation, by the processor CPU 601, of all or some of the methods and steps described above, particularly the method described in FIG. 2. Thus all or some of the methods and steps described above can be implemented in software form by the execution of a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit). The functions of the client electronic device 600 can be integrated in a client device, for example a smartphone, of a wireless network in accordance with an IEEE 802.11 standard by updating software, that is to say for example by updating the microprogram (firmware) of the client electronic device 600.

The invention claimed is:

1. A method, for a wireless communication network using a plurality of frequency bands and comprising at least one so-called client electronic device, each client electronic device comprising at least two radio modules, each radio module being adapted to use a frequency band in the plurality of frequency bands, and a so-called master electronic device, the master electronic device comprising at least two radio modules, each radio module being adapted to use a frequency band in the plurality of frequency bands, the method allowing the establishment of a plurality of simultaneous connections between a client electronic device and the master electronic device, the method being executed by the master electronic device and comprising the steps of:

receiving, via a first radio module of the master electronic device and coming from a first radio module of a client electronic device, a message comprising a request to establish a first connection between the master electronic device and the client electronic device, the message comprising an identifier associated with the client electronic device and a first item of authentication information associated with the request to establish a connection, determining whether a second connection is already established between a second radio module of the master electronic device and a second radio module of the client electronic device corresponding to the identifier received, and, if such is the case, then:

sending, via the second radio module of the master electronic device and intended for the second radio module of the client electronic device, a message comprising a request to verify the request to establish the first connection received, the message comprising the first item of authentication information received, receiving, via the second radio module of the master electronic device and coming from the second radio module of the client electronic device, a message comprising information validating the request to establish the first connection, and establishing the first connection between the first radio module of the client electronic device and the first radio module of the master electronic device.

2. The method according to claim 1, the message comprising the validation information also comprising a second item of authentication information, the master electronic device sending a message to the client electronic device in order to establish the first connection, this message comprising the second item of authentication information.

3. The method according to claim 1, the wireless communication network being in accordance with an IEEE 802.11 standard, each radio module of the master electronic device sending a signalling message comprising at least one first and one second wireless network identifier, the second wireless network identifier being determined according to the first network identifier, wherein each client electronic device wishing to establish a plurality of connections with the master electronic device establishes each connection using the second network identifier.

4. The method according to claim 1, the signalling message being:
   a beacon frame sent periodically, or
   a message sent in return after reception of a wireless-network detection message sent by a client electronic device.

5. The method according to claim 1, the method comprising a subsequent step of bonding the first radio connection with previously established connections, the bonding step comprising the steps of:
   updating a so-called bonding table, the table comprising, for each bonding, an associated identifier, the identifier associated with the client electronic device and a list of associated connections, and
   when a message is intended for the client electronic device, then:
      seeking, in the bonding table, the list of associated connections,
      determining a connection for sending the message,
      sending the message via the connection determined.

6. The method according to claim 5, the wireless communication network being in accordance with an IEEE 802.11 standard, each radio module of the master electronic device sending a signalling message comprising at least one first and one second wireless network identifier, the second wireless network identifier being determined according to the first network identifier, wherein each client electronic device wishing to establish a plurality of simultaneous connections with the master electronic device establishes each connection using the second network identifier.

7. A non-transitory storage medium storing a computer comprising instructions for implementing, by a processor of a master electronic device of a wireless communication network using a plurality of frequency bands, the master electronic device comprising at least two radio modules, each radio module being adapted to use a frequency band in the plurality of frequency bands, a method allowing the establishment of a plurality of simultaneous connections between a so-called client electronic device and the master electronic device according to claim 1, when the computer program is executed by the processor.

8. A method, for a wireless communication network using a plurality of frequency bands and comprising at least one so-called client electronic device, each client electronic device comprising at least two radio modules, each radio module being adapted to use a frequency band in the plurality of frequency bands, and a so-called master electronic device, the master electronic device comprising at least two radio modules, each radio module being adapted to use a frequency band in the plurality of frequency bands, the method allowing the establishment of a plurality of simultaneous connections between a client electronic device and the master electronic device, the method being executed by the client electronic device, a first connection being established between a first radio module of the client electronic device and a first radio module of the master electronic device, the method comprising the steps of:
   sending, via a second radio module of the client electronic device and to a second radio module of the master electronic device, a message comprising a request to establish a second connection, the message comprising an identifier associated with the client electronic device and a first item of authentication information associated with the connection establishment request,
   receiving, via the first radio module of the client electronic device and coming from the first radio module of the master electronic device, a message comprising a request to verify a request to establish a connection, the message comprising a second item of authentication information,
   determining whether the first item of authentication information is equal to the second item of authentication information and, if such is the case,
      sending, via the first radio module of the client electronic device and intended for the first radio module of the master electronic device, a message comprising information validating the request to establish the second connection, and
      establishing the second connection between the second radio module of the client electronic device and the second radio module of the master electronic device.

9. The method according to claim 8, the message comprising information validating the request to establish the second connection comprising in addition a second item of authentication information, the second connection between the second radio module of the client electronic device and the second radio module of the master electronic device being established only if the client electronic device receives a message requesting establishment of a connection of the master electronic device comprising the second item of authentication information.

10. A non-transitory storage medium storing a computer program comprising instructions for implementing, by a processor of a client electronic device of a wireless communication network using a plurality of frequency bands, the client electronic device comprising at least two radio modules, each radio module being adapted to use a frequency band in the plurality of frequency bands, a method allowing the establishment of a plurality of simultaneous connections between a so-called master electronic device and the client electronic device according to claim 8, when the computer program is executed by the processor.

11. A master electronic device, the master electronic device being adapted for being connected to a wireless communication network using a plurality of frequency bands and comprising at least one so-called client electronic device, each client electronic device comprising at least two radio modules, each radio module being adapted to use a frequency band in the plurality of frequency bands, the master electronic device comprising at least two radio modules, each radio module being adapted for using a frequency band in the plurality of frequency bands, the master electronic device being adapted for:
   receiving, via a first radio module of the master electronic device and coming from a first radio module of a client electronic device, a message comprising a request to establish a first connection between the master electronic device and the client electronic device, the message comprising an identifier associated with the client electronic device and a first item of authentication information associated with the request to establish a connection,
   determining whether a second connection is already established between a second radio module of the master electronic device and a second radio module of the client electronic device corresponding to the identifier received, and, if such is the case, then:
      sending, via the second radio module of the master electronic device and intended for the second radio module of the client electronic device, a message comprising a request to verify the request to establish the first connection received, the message comprising the first item of authentication information received, receiving, via the second radio module of the master electronic device and coming from the second radio module of the client electronic device, a message comprising information validating the request to establish the first connection, and establishing the first connection between the first radio module of the client electronic device and the first radio module of the master electronic device.

12. A client electronic device, the client electronic device being adapted to be connected to a wireless communication network using a plurality of frequency bands and comprising a so-called master electronic device, each master electronic device comprising at least two radio modules, each radio module being adapted to use a frequency band in the plurality of frequency bands, the client electronic device comprising at least two radio modules, each radio module being adapted to use a frequency band in the plurality of frequency bands, the client electronic device being adapted, when a first connection is established between a first radio module of the client electronic device and a first radio module of the master electronic device, to:

send, via a second radio module of the client electronic device and to a second radio module of the master electronic device, a message comprising a request to establish a second connection, the message comprising an identifier associated with the client electronic device and a first item of authentication information associated with the connection establishment request, receive, via the first radio module of the client electronic device and coming from the first radio module of the master electronic device, a message comprising a request for verification of a request to establish a connection, the message comprising a second item of authentication information, determine whether the first item of authentication information is equal to the second item of authentication information and, if such is the case, send, via the first radio module of the client electronic device and intended for the first radio module of the master electronic device, a message comprising information validating the request to establish the second connection, and establish the second connection between the second radio module of the client electronic device and the second radio module of the master electronic device.

\* \* \* \* \*